Jan. 19, 1926.

S. FOCHT

FISHHOOK BOOK

Filed Dec. 4, 1924

1,570,213

Inventor
S. Focht
By Dwift
his Attorney

Patented Jan. 19, 1926.

1,570,213

UNITED STATES PATENT OFFICE.

SAMUEL FOCHT, OF WATERTOWN, NEW YORK.

FISHHOOK BOOK.

Application filed December 4, 1924. Serial No. 753,837.

*To all whom it may concern:*

Be it known that I, SAMUEL FOCHT, a citizen of the United States, residing at Watertown, in the county of Jefferson, State of New York, have invented a new and useful Fishhook Book; and I do hereby declare the following to be a full, clear, and exact description of the invention, such as will enable others skilled in the art to which it appertains to make and use the same.

The invention relates to books for the reception of fish hooks, and has for its object to provide a device of this character having a plurality of relatively stiff leaves therein, which are held in the book by loose leaf structure, and which leaves are provided with spaced metallic strips registering with each other on opposite sides of the leaf, and the strips at one end of the leaf provided with hook receiving eyes for the reception of the hook portion of the hook, and the other strips centrally disposed, and at the other end of the leaf provided with struck out spring gripping fingers under which the snell carried by the hook is received and gripped, thereby positively holding the hooks on the leaf and allowing hooks to be easily selected therefrom and maintaining the hooks in straight positions at all times.

A further object is to secure the registering metallic strips on opposite sides of the leaves by the same rivets which pass through the strips and the leaf.

A further object is to provide the insides of the cover sections with pockets in which articles may be placed, such for instance as fish lines or other fishing accessories.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
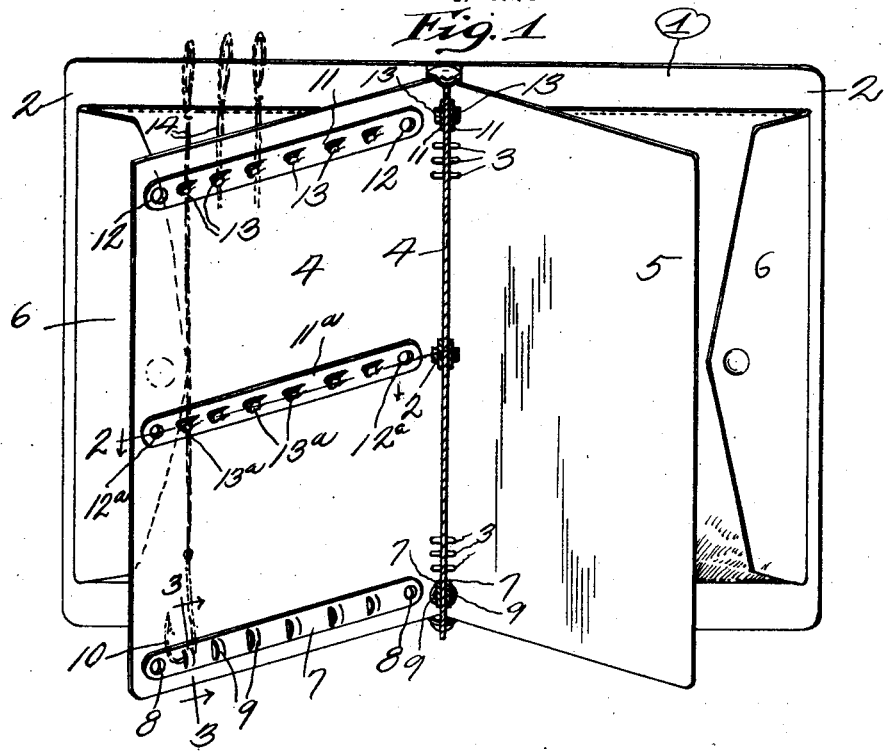
Figure 1 is a perspective view of the fish hook book, showing the same partially open, and one of the pages in section to better show the structure.
Figure 2:
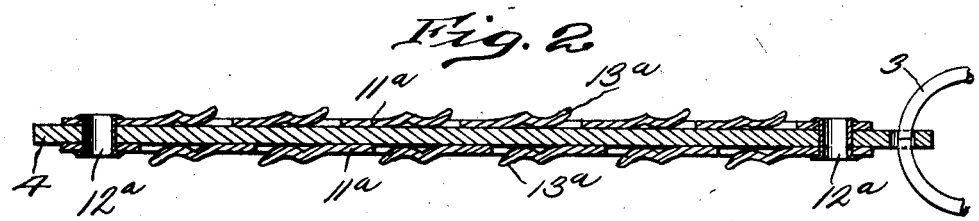
Figure 2 is a horizontal sectional view through one of the leaves taken on line 2—2 of Figure 1.
Figure 3:
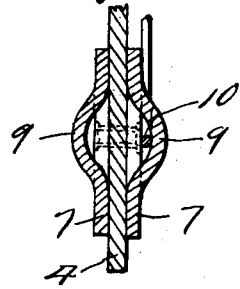
Figure 3 is a detail sectional view taken on line 3—3 of Figure 1.

Referring to the drawing, the numeral 1 designates the back of the book which comprises the sections 2 which are adapted to be folded onto each other. The back 1 of the book is provided with a conventional form of loose leaf mechanism having spaced rings 3, which are adapted to separate in the usual manner, and on which rings the loose leaves 4 and 5 are mounted in the usual manner so that they may be easily removed or replaced as desired. Leaves 4 and 5 are formed from relatively heavy substantially rigid material such for instance as cardboard, and the leaf 5 is provided for preventing hooks from coming into engagement with the pockets 6 carried by the inner sides of the cover sections 2, and in which pockets various articles may be placed, for instance as extra snells or fishing lines. It is to be understood that any number of leaves may be used in the book, however for purposes of illustration only two leaves 4 are shown, and one of said leaves will be specifically described and the same reference numerals will apply to all of the leaves 4.

Each leaf 4 adjacent one of its ends is provided with registering metallic strips 7 which extend across the leaf and are secured thereto by means of rivets 8, which pass through the strips 7 adjacent their ends and through the leaf. Strips 7 are provided with struck out eyes 9, into which the fish hook 10 is hooked with its shank extending longitudinally in relation to the leaf. Adjacent the other end of the leaf registering metallic strips 11 are secured to opposite sides of the leaf, and which strips are secured together by means of rivets 12, which extend through the strips, and leaf in a manner similar to the rivets 8. The metallic strips 11 are provided with struck out spring fingers 13 under which the snells 14 of the hooks are forced and held, therefore it will be seen that the hooks 10 are held against coming out of the eyes 9, and at the same time the snells 14 are held straight, thereby preventing kinks in the snells, and at the same time allowing the hooks to be easily stored and carried, and a selection to be easily and quickly made from the hooks. To further hold the snells 14, the leaf 4, adjacent its center is provided with registering metallic strips 11ª similar to the strips 11, and which strips 11ª are provided with struck out spring gripping fingers 13ª, similar to the gripping fingers 13. Strips 11ª are secured to opposite sides of the leaf 4 by means of the securing rivets 12ª in a similar manner to the securing means for the other strips 11 and 7. The spring fingers 13ª form additional holding means for the snells and additionally prevent the hooks 10 from coming out of the loops 9. When it is desired to remove a hook from the leaf 4, the operator preferably grasps the snell and forces the same from under the spring fingers 13 and 13ª and rolls the snell upon itself, then the hook 10 is moved to a position at substantially a right angle to the position shown in Figure 1, and the hook is then moved out of the loop 9.

From the above it will be seen that a loose leaf fish hook receiving book is provided, in which the number of leaves may be varied as desired and each leaf is formed from relatively stiff material, and provided with means for receiving and holding in spaced position, and parallel relation a plurality of hooks and snells. It will also be seen that a hook and its snell may be easily and quickly removed from the book.

The invention having been set forth what is claimed as new and useful is:—

A fish hook book comprising a cover, a plurality of separable rings within said cover, a plurality of relatively stiff leaves carried by said rings, said leaves on opposite sides thereof having secured thereto adjacent one of the ends of the leaves registering metallic strips, struck out eyes carried by said strips for the reception of fish hook shanks and spaced between the sides of the strips, registering metallic strips adjacent the other end of the leaves and secured to opposite sides of the leaves, struck out spring fingers carried by said strips and spaced between the sides of the strips and adapted to receive and grip snells, metallic strips intermediate the first mentioned strips and struck out spring fingers carried by said last named metallic strips between their sides and adapted to grip snells intermediate their ends.

In testimony whereof I have signed my name to this specification.

SAMUEL FOCHT.